United States Patent
Li et al.

(10) Patent No.: US 8,135,490 B2
(45) Date of Patent: Mar. 13, 2012

(54) SYSTEMS AND TECHNIQUES FOR REDUCING GROUP DELAY RIPPLE IN A DISPERSION COMPENSATING GRATING

(75) Inventors: Yaowen Li, Princeton, NJ (US); Gary C. Hancsin, Three Bridges, NJ (US); Carl E. Soccolich, Flemington, NJ (US)

(73) Assignee: OFS Fitel, LLC, Norcross, GA (US)

( * ) Notice: Subject to any disclaimer, the term of this patent is extended or adjusted under 35 U.S.C. 154(b) by 399 days.

(21) Appl. No.: 12/390,490

(22) Filed: Feb. 22, 2009

(65) Prior Publication Data

US 2009/0230580 A1    Sep. 17, 2009

Related U.S. Application Data

(60) Provisional application No. 61/032,206, filed on Feb. 28, 2008.

(51) Int. Cl.
*G06F 19/00* (2006.01)
*G02B 6/34* (2006.01)

(52) U.S. Cl. .......................................... 700/166; 385/37

(58) Field of Classification Search .................. 700/160, 700/166; 385/37
See application file for complete search history.

(56) References Cited

U.S. PATENT DOCUMENTS

| | | | |
|---|---|---|---|
| 6,483,965 B1 * | 11/2002 | Napier et al. | 385/37 |
| 6,548,225 B1 * | 4/2003 | Hammon et al. | 430/321 |
| 6,753,118 B2 | 6/2004 | Deshmukh et al. | |
| 7,142,292 B2 | 11/2006 | Painchaud | |
| 2002/0081068 A1 * | 6/2002 | Matsumoto et al. | 385/37 |
| 2002/0164121 A1 * | 11/2002 | Brennan et al. | 385/37 |
| 2009/0067783 A1 * | 3/2009 | Webb et al. | 385/27 |

OTHER PUBLICATIONS

Cho et al., "Fabrication and Analysis of Chirped Fiber Bragg Gratings by Thermal Diffusion," ETRI Journal, Aug. 2004, vol. 26, No. 4, pp. 371-374.

* cited by examiner

*Primary Examiner* — Ryan Jarrett
(74) *Attorney, Agent, or Firm* — Jacobs & Kim LLP (57) ABSTRACT

A technique is described for reducing group delay ripple in a fiber dispersion compensation grating. The grating is mounted into a trimming setup that includes a trimming device and a scanning assembly for causing a region of the grating to be scanned along its length by the trimming device output. The grating is sensitive to the trimming device output, such that exposure to the trimming device output causes a change in the effective refractive index of the scanned region, the amount of change varying as a function of scanning velocity. A region of the grating to be trimmed is selected, and a scanning velocity profile is programmed into the scanning assembly that is calculated to modify the effective refractive index of the selected grating region along its length so as to smooth out group delay ripple in the selected grating region.

16 Claims, 13 Drawing Sheets

```
111. MOUNT THE GRATING INTO THE TRIMMING SETUP.
        ↓
112. USE A CIRCULATOR AND BROADBAND SOURCE TO
     GET THE REFLECTION SPECTRUM ON OSA.
        ↓
113. FIND 1 dB CENTER WAVELENGTH.
        ↓
114. TURN ON THE HEATER TO 0.25 V AND MOVE THE
     HEATER SO THAT THE DIP ON THE SPECTRUM IS
     ALIGNED TO
             $\lambda_{1dB} - \frac{BW}{2}$           ← TRIMMING BANDWIDTH (A)
        ↓
115. MOVE THE HEATER SO THAT THE DIP IS ALIGNED
     TO
             $\lambda_{1dB} + \frac{BW}{2}$           → SCANNING DISTANCE (B)
     THE MOVING DISTANCE IS THE SCANNING DISTANCE.
        ↓
116. MOVE THE HEATER BY OFFSET (5 mm) BEFORE
             $\lambda_{1dB} - \frac{BW}{2}$
     OR
             $\lambda_{1dB} + \frac{BW}{2}$
     POINT FOR POSITIVE AND NEGATIVE DISPERSION
     GRATINGS, RESPECTIVELY.
```

| Dispersion (ps/nm) | 710 to 730 | 730 to 750 | 750 to 770 | 770 to 790 | 790 to 810 | 810 to 830 | 830 to 850 | 850 to 870 | 870 to 890 | 890 to 910 | 910 to 930 |
|---|---|---|---|---|---|---|---|---|---|---|---|
| Bandwidth (nm) | 0.82 | 0.8 | 0.78 | 0.76 | 0.74 | 0.72 | 0.70 | 0.68 | 0.66 | 0.64 | 0.62 |

SYSTEMS AND TECHNIQUES FOR REDUCING GROUP DELAY RIPPLE IN A DISPERSION COMPENSATING GRATING

CROSS-REFERENCE TO RELATED APPLICATIONS

This application for patent claims the priority benefit of U.S. Provisional Patent Application Ser. No. 61/032,206, filed on Feb. 28, 2008.

BACKGROUND OF THE INVENTION

1. Field of the Invention

The present invention relates generally to optical fiber devices and methods, and in particular to improved systems and methods for reducing group delay ripple in a dispersion compensating fiber Bragg grating.

2. Description of Prior Art

A fiber Bragg grating (FBG) is an optical device having a central waveguide for carrying optical data signals of varying wavelengths. An FBG includes a number of grating regions, each of which causes signals of a particular wavelength, known as the "Bragg wavelength," to be reflected back down the length of the grating, while allowing other wavelengths to pass. An FBG may be designed for use as a dispersion compensator that introduces into an optical link a wavelength-dependent group delay having a slope opposite to that of a wavelength-dependent group delay in an optical link. The FBG group delay is created by designing the grating regions such that the distance traveled along the length of the grating by a signal varies in a generally linear relationship with the signal's wavelength.

However, for a number of reasons including, for example, manufacturing imperfections, the group delay exhibited by a dispersion compensating grating (DCG) typically includes an undesirable "ripple" that may lead to transmission slowdown and errors, particularly where an optical transmission system includes a plurality of FBGs. There thus exists a need for systems and techniques for reducing this group delay ripple to an acceptably low level.

SUMMARY OF THE INVENTION

These and other issues of the prior art are addressed by the present invention, a first aspect of which is directed to a technique for reducing group delay ripple in a fiber grating. The grating is mounted into a trimming setup that includes a trimming device and a scanning assembly for causing a region of the grating to be scanned along its length by the trimming device output. The grating having a chemical composition that is sensitive to the trimming device output, such that exposure to the trimming device output causes a change in the effective refractive index of the scanned region, the amount of change varying as a function of scanning velocity. A region of the grating to be trimmed is selected, and a scanning velocity profile is programmed into the scanning assembly that is calculated to modify the effective refractive index of the selected grating region along its length so as to smooth out group delay ripple in the selected grating region. Further aspects of the invention include techniques for locating the grating trimming region and for calculating the scanning velocity profiles.

Additional features and advantages of the present invention will become apparent by reference to the following detailed description and accompanying drawings.

DETAILED DESCRIPTION

A fiber Bragg grating is an optical device formed from an optical fiber having a central waveguide, the refractive index of which has been modified to include a periodic series of variations. In a given grating region, the periodic variation in the refractive index causes a particular wavelength, known as the "Bragg wavelength," to be reflected back down the length of the grating, while allowing other wavelengths to pass. For a given grating region, the Bragg wavelength λ is a function of the region's effective refractive index $n_{eff}$ and grating period Λ, expressed as follows:

$$\lambda = 2 \cdot n_{eff} \cdot \Lambda \qquad (1)$$

One use for a fiber Bragg grating is to provide dispersion compensation in an optical link in which data is transmitted down a length of optical fiber as a series of pulses of light. A pulse typically represents a binary "1." The time slot for this optical pulse depends on its transmission speed. However, an optical pulse in a typical data signal is not monochromatic but rather includes different wavelength components that travel through the fiber at different speeds. At relatively short transmission distances, the differences in speed are small enough not to present an issue. However, after the pulse travels a certain distance through an optical fiber, the differences in speed result in a significant "spreading" of the pulse. In an extreme case, a pulse may spread to the point that it crosses into the time slot of a neighboring bit. Thus, a binary "1" pulse may spread into a neighboring "0," at which point the receiver may no longer be able to distinguish the "0" bit. Dispersion may be either positive or negative, depending upon the slope of the relationship between transmission wavelength and transmission time.

A dispersion-compensating grating (DCG) reduces pulse spreading by introducing an offsetting amount of wavelength-dependent delay into a transmission link. This delay is created by causing different wavelength components of a pulse to travel different distances down the length of the grating. Thus, in a negative DCG, shorter wavelength components travel greater distances than longer wavelength components, thereby using more time.

In a typical DCG, the relationship between wavelength and delay displays a certain amount of "group delay ripple," i.e., irregular deviations from the desired relationship. Reasons for this ripple include, for example, imperfections introduced by the manufacturing process. Group delay ripple may result in significant decrease in performance, particularly in an optical link including a plurality of DCGs.

Aspects of the present invention provide systems and techniques for reducing group delay ripple in a fiber grating by using a laser, filament heater, or other suitable heater, heating element, or trimming device, to make corrective changes to the effective refractive index along a selected grating region. The described systems and techniques are based on Equation 1, which is repeated for convenient reference:

$$\lambda = 2 \cdot n_{eff} \cdot \Lambda \qquad (1)$$

A regular dispersion plot shows the relationship between the group delay and wavelength. In the ideal DCG case, the plot should be linear. For a certain wavelength, the deviation of the group delay from the linear relationship is the group delay ripple at that wavelength. One can also try to show the plot by the wavelength vs. group delay, and find that for a group delay value, if the DCG is not ideal, there is a wavelength deviation from the linear relationship at that group delay. Thus, correction of the group delay ripple can be transferred to correction of the wavelength deviation. From Equation (1), it will be seen these wavelength deviations $\Delta\lambda$ can be converted into deviations in the effective refractive index $\Delta n_{eff}$ along the length of the grating, as shown in Equation (2):

$$\Delta n_{eff} = \frac{1}{2\Lambda} \cdot \Delta\lambda \qquad (2)$$

Thus, from Equations 1 and 2, it will be seen that it is possible to adjust the Bragg wavelength at a given location along the length of the grating by adjusting the effective refractive index $n_{eff}$.

The trimming device is used in conjunction with a fiber grating having a chemical composition that is sensitive to the trimming device output, such that exposure to the trimming output causes a controlled change in the effective refractive index of the exposed region. The amount of change in the effective refractive index varies as a function of exposure time. Thus, it is possible to control the amount of change along a scanned region of the fiber grating by controlling the scanning velocity. Thus, according to an aspect of the present invention, group delay ripple is reduced by calculating and running a scanning velocity profile that changes the effective refractive index along the scanned grating region so as to smooth out the relationship between grating distance and Bragg wavelength.

Figure 1:
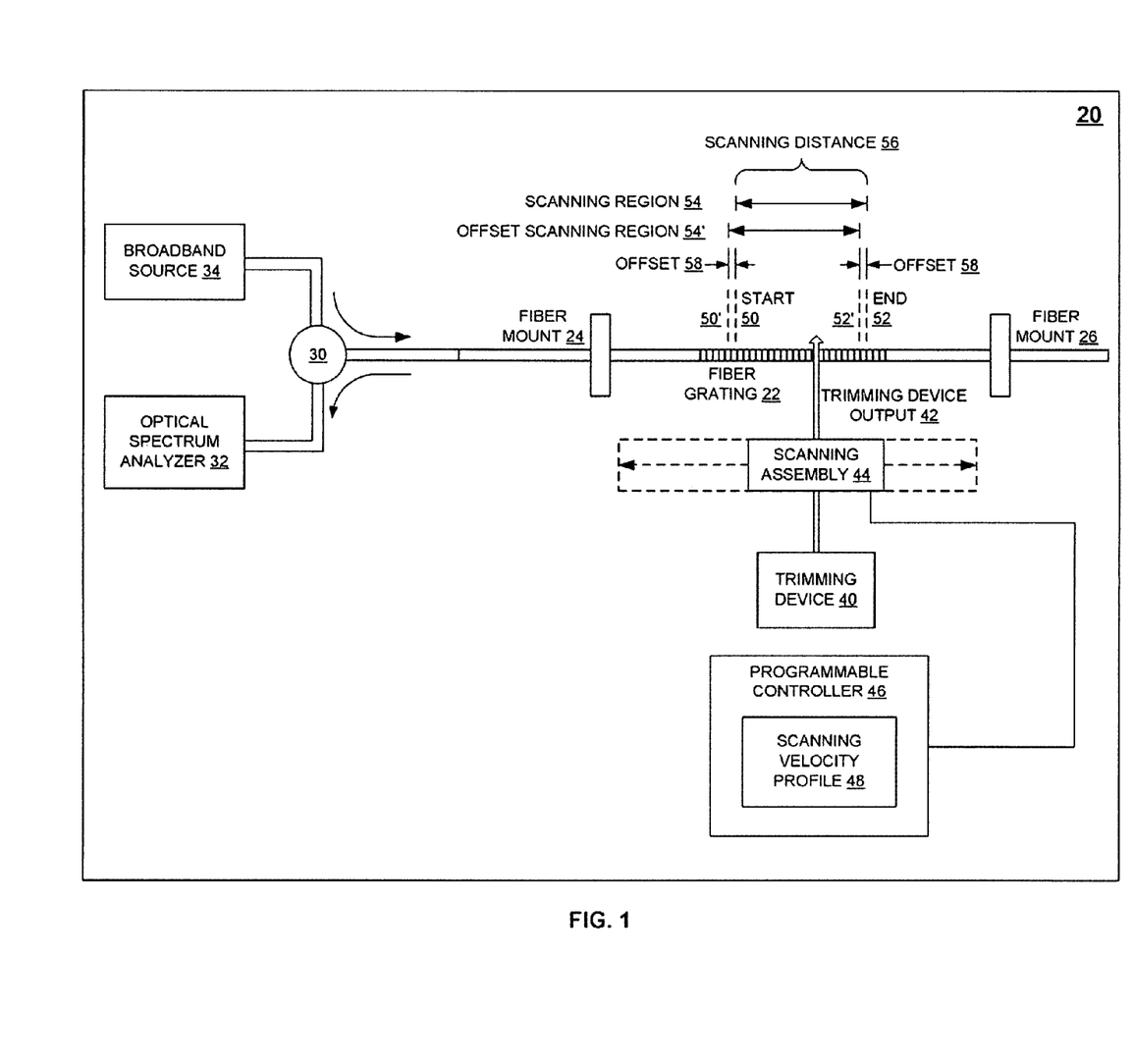
FIG. 1 shows a diagram of first and second trimming setups according to the present invention.

FIG. 1 shows a diagram of a trimming setup 20 according to a first aspect of the invention for reducing group delay ripple (GDR) in a fiber dispersion-compensating grating (DCG) 22. First and second fiber mounts 24 and 26 are used to securely hold first and second ends of the grating 22, leaving exposed the portion of the grating 22 to be trimmed. A circulator 30 is used to couple a lead end of the grating 22 to an optical spectrum analyzer (OSA) 32 and a broadband source 34. As described in detail below, the OSA 32 and broadband source 34 are used to generate data for the grating 22 that is used in conjunction with other described components of setup 20 to locate a region along the length of grating 22 to be trimmed.

Trimming setup 20 further includes A suitable trimming device 40, such as a UV-laser, a filament heater, or the like, having an output 42 that is scanned along the length of the exposed portion of grating 22 by means of a scanning assembly 44 comprising a translation stage or other suitable translating device. The movement of the trimming output 42 is controlled by a programmable controller 46, into which has been programmed a scanning velocity profile 48 that has been constructed, as described in detail below, so as to cause corrective changes in effective refractive index $\Delta n_{eff}$ along the length of the scanned region, such that group delay ripple is reduced to an acceptable level.

As discussed above, the grating 22 has a chemical composition that is sensitive to the trimming device output 42, such that exposure to the output causes a change in the grating's effective refractive index. The amount of change increases as a function of exposure time. It is thus possible to predictably vary the amount of change in effective refractive index $\Delta n_{eff}$ down the length of a scanned region of the fiber by varying the scanning velocity. Slower movement of the trimming output 42 along the length of grating 22 will result in a greater amount of change, and faster movement of the trimming output 42 will result is a lesser amount of change. The relationship between scanning velocity and $\Delta n_{eff}$ is reflected in a calibration curve, discussed below.

For the purposes of the present discussion, it is assumed that the trimming device output 42 is of a much larger physical scale than the phase changes of grating 22. Thus, the described trimming process will not affect the complex phase of the grating 22. Therefore, for example, a laser with abeam diameter of 1-2 mm would be suitable, as well as a filament heater having a similarly sized heating zone.

It should be noted that in the present example the fiber grating 22 is stationary, and the trimming device output 42 is moved to create the desired scanning. However, it will be appreciated that the described invention may also be practiced using a trimming station in which the trimming device output 42 is stationary and the fiber grating 22 is moved, or in which both the trimming device output 42 and the fiber grating 22 are moved.

There are now described techniques (1) to determine the location and length of a physical region along the length of the grating 22 that accurately corresponds to a trimming bandwidth, and (2) to construct a scanning velocity profile 48 that, when run, results in a reduction of group delay ripple.

Figure 2A:
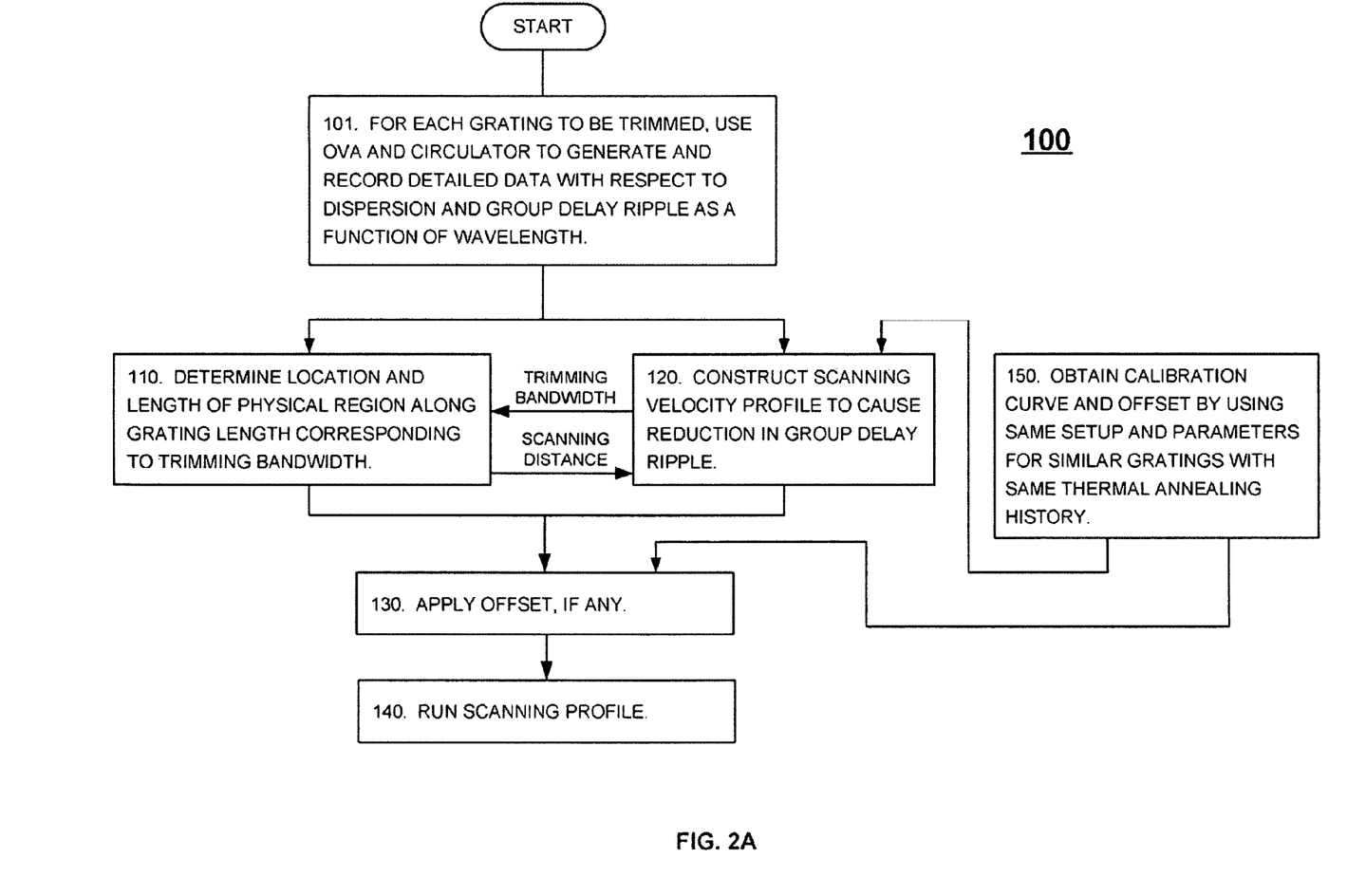
FIGS. 2A-2C are a series of flowcharts illustrating a method according to an aspect of the invention for reducing group delay ripple in a fiber dispersion-compensation grating.

FIG. 2A is a flowchart of an overall technique 100 according to an aspect of the present invention. In step 101 an optical vector analyzer (OVA) and circulator are used to generate and record, for each grating to be trimmed, detailed data with respect to dispersion and group delay ripple, as a function of wavelength. In the presently described example of the invention, the OVA used to gather dispersion and GDR data is the Luna Optical Vector Analyzer, with built-in circulator, manufactured by Luna Technologies, Blacksburg, Va. However, it will be appreciated from the following discussion that the presently described invention may be practiced using other types of OVAs and like devices.

It will be appreciated from the present description that it would theoretically be possible to gather the dispersion and GDR data after the grating is mounted into the described trimming setup. However, because an OVA is a relatively expensive piece of equipment, it is more practical to perform the described data generation and storage all at once for a given batch of gratings, prior to trimming. The OVA data may be used for quality control, i.e., for determining which gratings have an acceptably low level of GDR, and which gratings require trimming.

After the required dispersion and GDR data has been generated and stored for a grating to be trimmed, the technique 100 proceeds from step 101 to steps 110 and 120. In step 110, which is described in greater detail in the flowchart shown in FIG. 2B and in the accompanying text, there is determined the location and length of a physical region along the length corresponding to a designated trimming bandwidth. In step 120, which is described in greater detail in the flowchart shown in FIG. 2C and in the accompanying text, there is constructed a scanning velocity profile to cause a reduction in the group delay ripple. As shown in FIG. 2A, steps 110 and 120 are interconnected. The scanning velocity profile constructed in step 120 is based upon an analysis of the stored OVA data, from which there is derived a trimming bandwidth that is used in step 110 to determine the location and length of the grating region to be trimmed. The scanning distance, i.e., the length of the grating region to be trimmed, is then used in step 120, in conjunction with other data, to construct the scanning velocity profile.

In step 130, an offset is applied, if one is required. The reason for an offset is discussed below with respect to FIGS. 8-11. Finally, in step 140, the scanning profile is run.

As further shown in FIG. 2A, in step 150 the velocity vs. $\Delta n_{eff}$ calibration curve used in step 120 and the offset used in step 130 are obtained by using the same setup and parameters in a series of trial trimmings for similar gratings with the same photosensitizing and thermal annealing history.

Figure 2B:
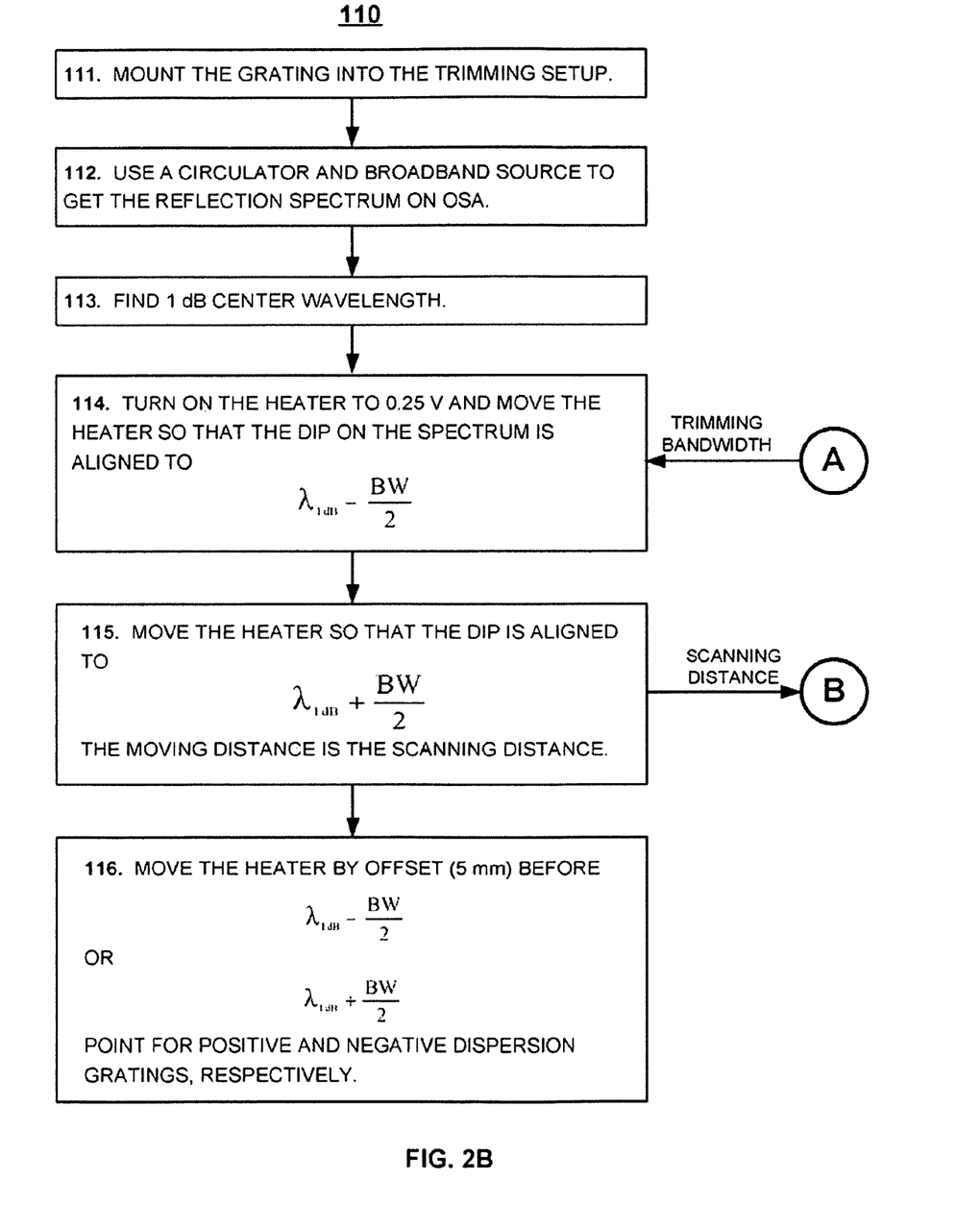

FIG. 2B illustrates step 110 in greater detail. For the purposes of the present example, it is assumed that the trimming device is a filament heater. However, it will be appreciated that the present discussion also applies to other types of trimming device, including lasers, and the like.

In step 111, the grating 22 is mounted into the trimming setup 20.

In step 112, a circulator 30, OSA 32, and broadband source 34 are used to obtain a reflection spectrum for grating 22. The OSA 32 remains connected to the grating through steps 113-116.

In step 113, the 1 dB center wavelength $\lambda_{1\ dB}$ is located on the reflection spectrum.

In step 114, the heating element used as trimming device 40 is turned on to 0.25 V, which causes a noticeable dip in the reflection spectrum. The translation stage 44 is used to move the heating element output 42 until the dip on the spectrum is aligned to $\lambda_{1\ dB}$–BW/2, where BW is the bandwidth derived from the stored OVA data, as set forth in step 121 of the flowchart shown in FIG. 2C, discussed below. For a positive dispersion grating, the physical location on grating 22 corresponding to $\lambda_{1\ dB}$–BW/2 is the scan starting point 50 (FIG. 1), prior to offset. (For a negative dispersion grating, the physical location on grating 22 corresponding to $\lambda_{1\ dB}$–BW/2 is the scan ending point, prior to offset.)

In step 115, the heating element output 42 is then moved so that the dip is aligned to $\lambda_{1\ dB}$+BW/2. For a positive dispersion grating, the physical location on grating 22 corresponding to $\lambda_{1\ dB}$+BW/2 is the scan ending point 52 (FIG. 1), prior to offset. (For a negative dispersion grating, the physical location on grating 22 corresponding to $\lambda_{1\ dB}$+BW/2 is the scan starting point, prior to offset.)

In step 116, an offset 58 (FIG. 1) is applied to the starting point 50, resulting in an offset scanning region 54' having an offset starting point 50' and an offset ending point 52'. The reason for the offset is discussed below. In the present example, the offset is 5 mm.

Figure 2C:
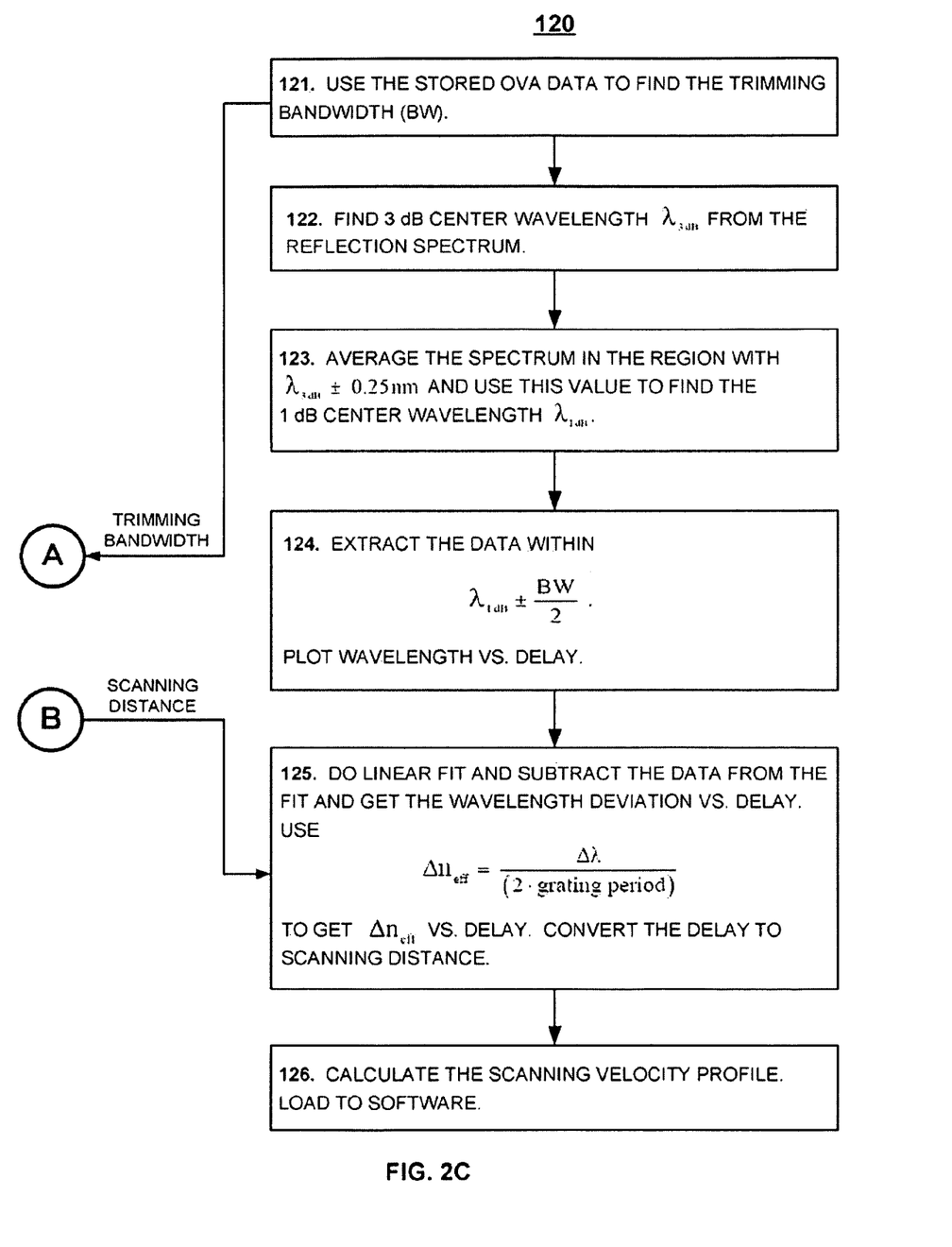

FIG. 2C illustrates step 120 of FIG. 2A in greater detail:

In step 121, the stored OVA data from step 101 (FIG. 2A) is used to find the trimming bandwidth (BW) for the grating. Trimming bandwidth BW is also used in step 114 (FIG. 2B).

In step 122, the 3 dB center wavelength, $\lambda_{3\ dB}$ is found for the OVA reflection spectrum.

In step 123, the spectrum in the region with $\lambda_{3\ db}$±0.25 nm is averaged, and this averaged amplitude value is used to find the 1 dB bandwidth and center wavelength $\lambda_{1\ dB}$.

In step 124, the data within $\lambda_{1\ dB}$±BW/2 is extracted, and this data is used to plot wavelength vs. delay for the trimming bandwidth.

In step 125, a linear fit is performed. The data from step 124 is subtracted from the fit, in order to obtain the wavelength deviation vs. delay. The relationship $$\Delta n_{eff} = \frac{\Delta \lambda}{2 \cdot \text{grating period}}$$

is used to get $\Delta n_{eff}$ vs. delay. The scanning distance from step 115, discussed above, is used to convert the delay to scanning distance.

In step 126, the scanning velocity profile 38 is calculated and loaded.

The technique set forth in FIGS. 2A-2C is now described with respect to specific examples. For the purpose of the present discussion, it is assumed that the gratings being trimmed are mounted into the trimming setup 20 shown in FIG. 1, or the like.

Figure 3:
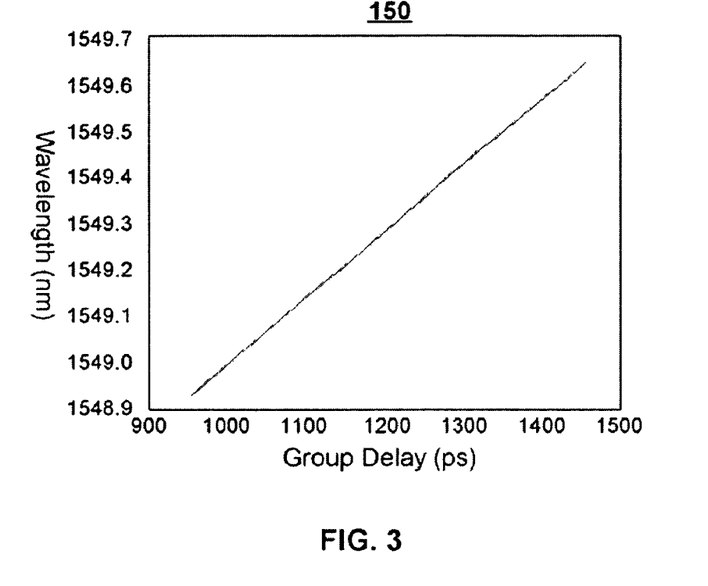
FIG. 3 is a plot from an optical vector analyzer (OVA) illustrating the relationship between wavelength and group delay in an exemplary fiber grating.
Figure 4:
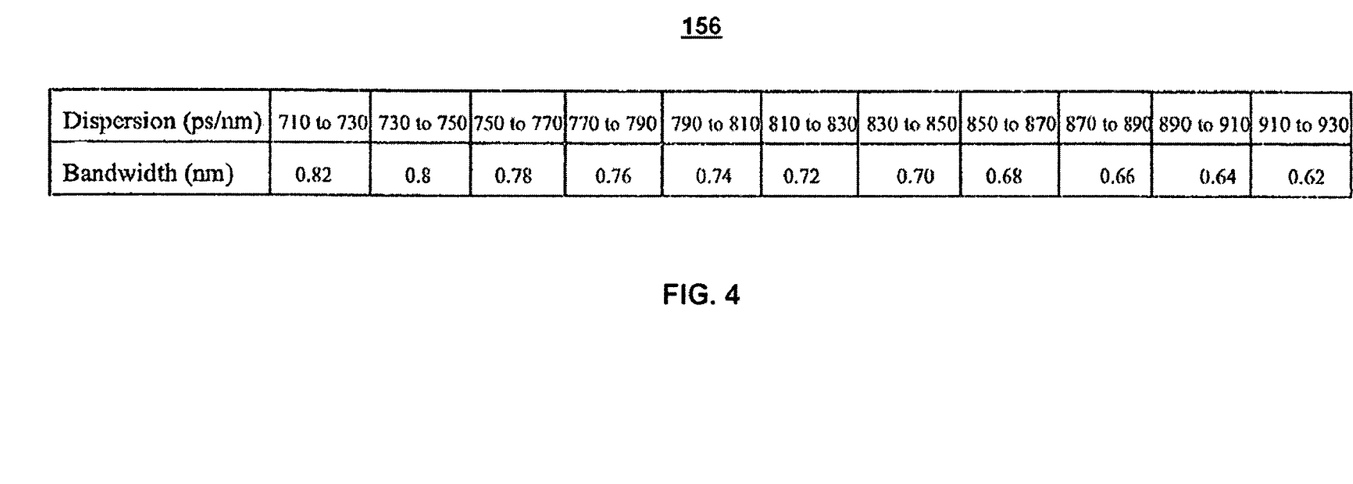
FIG. 4 shows a table for looking up a trimming bandwidth based on a measured dispersion slope.

FIGS. 3 and 4 show, respectively, a graph 150 and a lookup table 156 illustrating step 121 in the FIG. 2 flowchart.

Figure 3A:
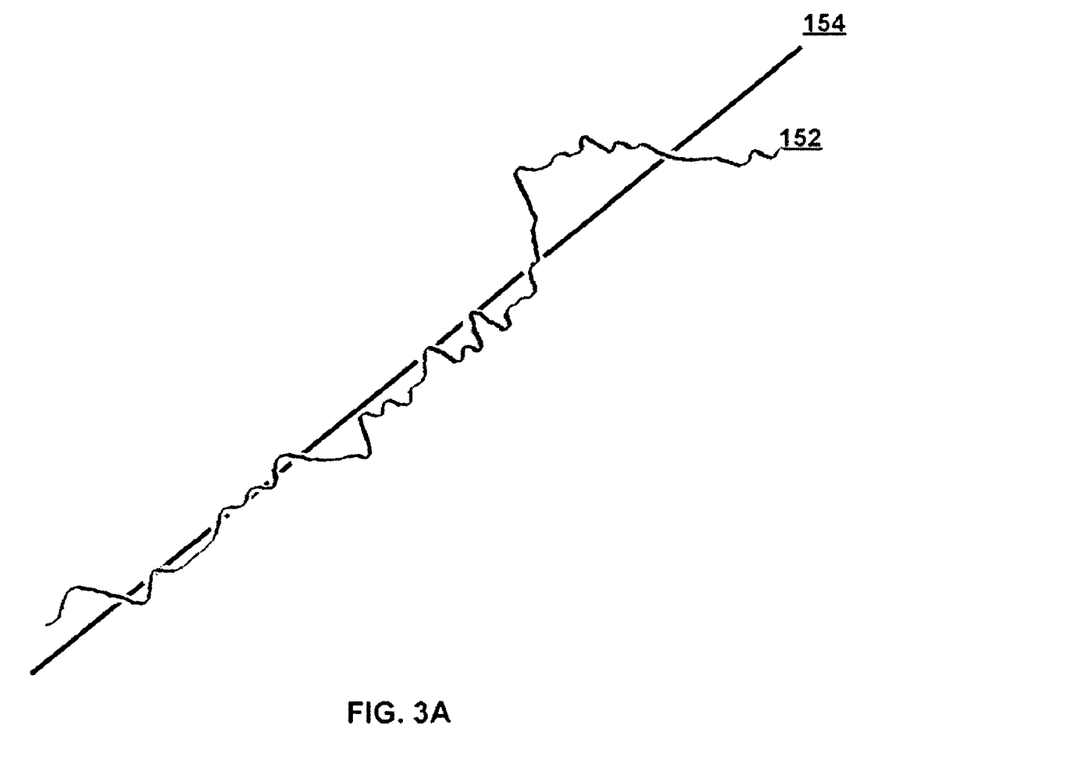
FIG. 3A is a close-up view of a portion of the plot, with a fitted line.

FIG. 3 shows a graph 150 using the group delay vs. wavelength data from an optical vector analyzer. As pointed out previously, this plot shows the wavelength vs. group delay. As shown in FIG. 3, the plot appears to be generally linear. FIG. 3A, however, shows a close-up view of a portion of the plot 152, which clearly shows a ripple when juxtaposed with fitted line 154. The presently described technique tries to make every point on the plot approach the fitted line, thus minimizing wavelength deviation.

The inverse of the slope of dispersion plot 152 is the dispersion level in ps/nm and used to find the trimming bandwidth. In the present example, the trimming bandwidth is found using a lookup table, such as the table shown in FIG. 4.

Figure 5:
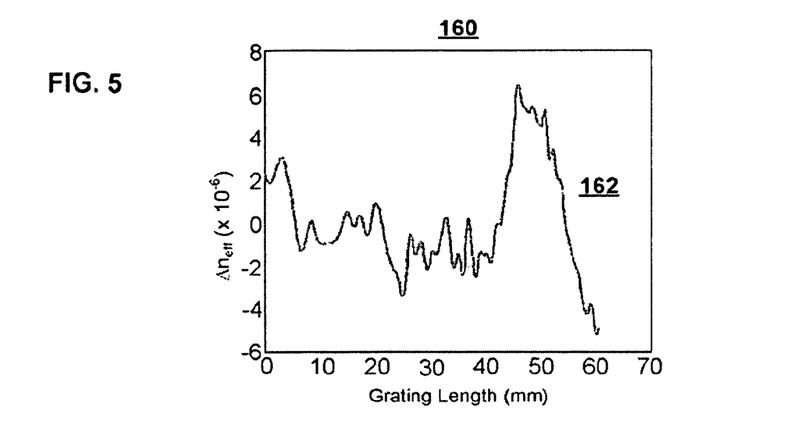
FIG. 5 is a graph illustrating the relationship in the exemplary fiber between deviation in effective refractive index and position along the length of the grating.

FIG. 5 is a graph 160 illustrating the result of the application of steps 122-125 in the FIG. 2C flowchart. The wavelength deviation has been converted into plot 162, which sets forth the relationship between position along the length of the grating and deviation of effective refractive index $\Delta n_{eff}$.

Figure 6:
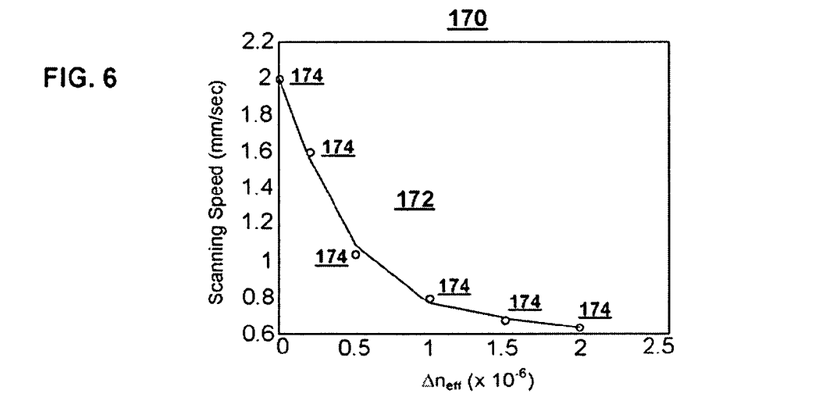
FIG. 6 is a calibration curve illustrating the relationship between the amount of change in refractive index caused by the trimming device output and scanning speed.

FIG. 6 shows a graph 170 setting forth a calibration curve 172 that is obtained as described in step 150 of the FIG. 2A flowchart. Calibration curve 172 is fitted to six data points 174 and sets forth the relationship between $\Delta n_{eff}$ and scanning speed, measured in millimeters per second. The six data points 174 are obtained by conducting a series of trials using the same trimming setup 20 with like gratings.

Figure 7:
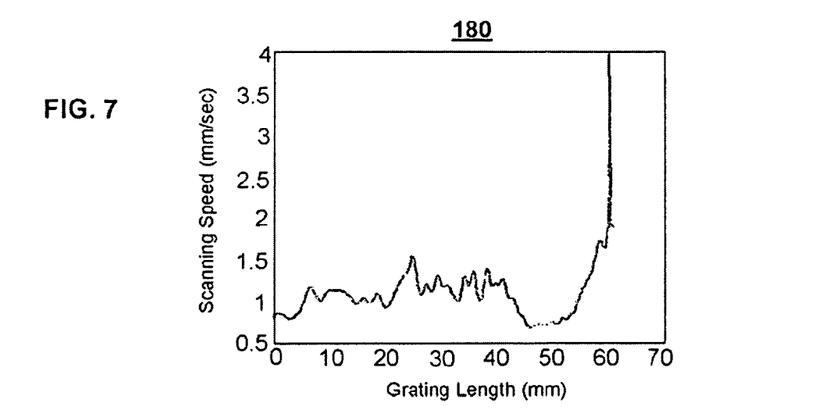
FIG. 7 is a graph illustrating a scanning velocity profile, in which scanning speed is plotted as a function of position along the length of the grating.

FIG. 7 is a graph 180 showing a scanning velocity profile 182 that is obtained by applying the FIG. 6 calibration curve 170 to the FIG. 5 plot 160. FIG. 7 corresponds to step 126 of the FIG. 2C flowchart. As mentioned above, in the present example, the trimming filament smoothes out the ripple by making corrective decreases to the effective refractive index.

Thus, the scanning profile has a generally complementary relationship with $\Delta n_{eff}$. Peaks in the $\Delta n_{eff}$ plot are aligned with troughs in the velocity profile, and vice versa.

It has been found with the particular grating and trimming setup used in the present example, it is necessary to use an offset with the scanning velocity profile. FIGS. 8-11 are a series of plots illustrating this offset.

Figure 8:
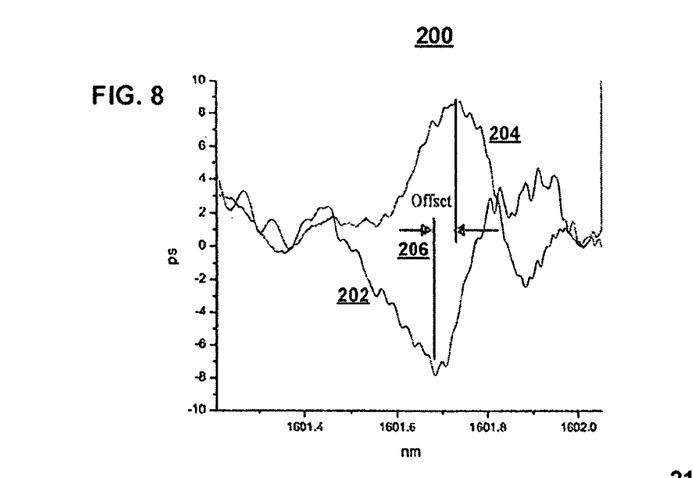
FIGS. 8-11 are a series of plots illustrating an example of an offset for use with a scanning profile.

FIG. 8 shows a plot 200 of the group delay ripple of a sample grating. The lower trace 202 shows the pre-trimming group delay ripple (smoothed with a 0.1 nm window) obtained by subtracting a fitted line from the measured group delay data. The described trimming technique is then performed as described above, i.e., without the use of an offset. The upper trace 204 is obtained by subtracting the pre-trimming group delay from the post-trimming group delay, and represents the group delay changes caused by the effective refractive index changes along the length of the scanning region.

Figure 9:
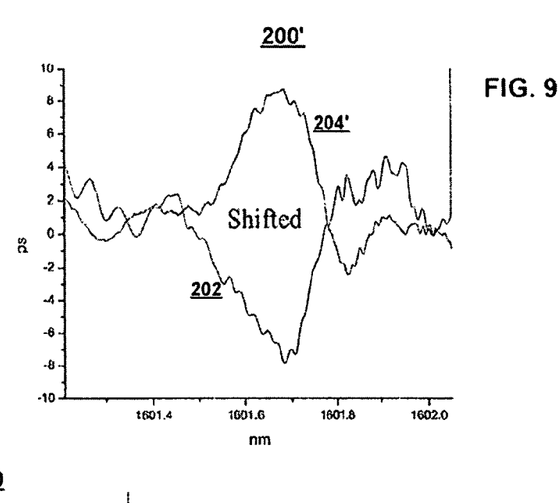

As is apparent from FIG. 8, the lower and upper traces 202 and 204 do not line up with each other. Rather, it will be seen that there is a discrepancy 206 between the two traces. FIG. 9 shows a plot 200', in which the position of lower trace 202 has been maintained, but in which an offset has been applied to the upper trace 204 to cause it to shift to the left to produce trace 204', which is now complementarily aligned with trace 202.

As discussed above, movement along the x-axis, which represents wavelength in nanometers, corresponds to movement along the length of the grating. In the present example, the offset 206 of the upper trace corresponds to an offset of approximately 5 mm on the physical grating. Thus, in order to obtain the desired alignment of the traces 202 and 204, the translation stage is used to offset the starting point of the scan by a distance of 5 mm. It will be appreciated that the offset distance may vary, depending upon the characteristics of the grating, heating element, and trimming setup. Thus, it may be necessary to conduct a number of trials in order to obtain a suitable offset.

Figure 10:
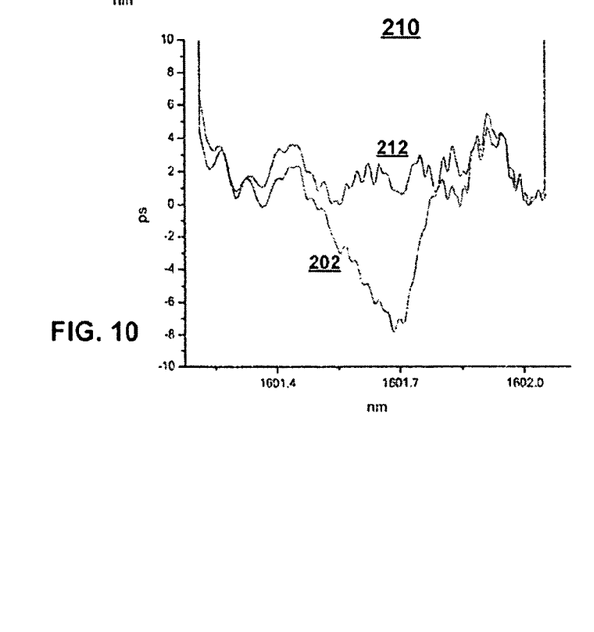

FIG. 10 shows a plot 210 illustrating the result of the trimming technique. The lower trace 202 shows the pre-trimming group delay ripple, also shown in FIGS. 8 and 9. The upper trace 212 shows the result of the trimming process, if the described offset is applied. As shown in FIG. 10, the present technique produces a significant reduction in the group delay ripple in the trimmed grating region.

Figure 11:
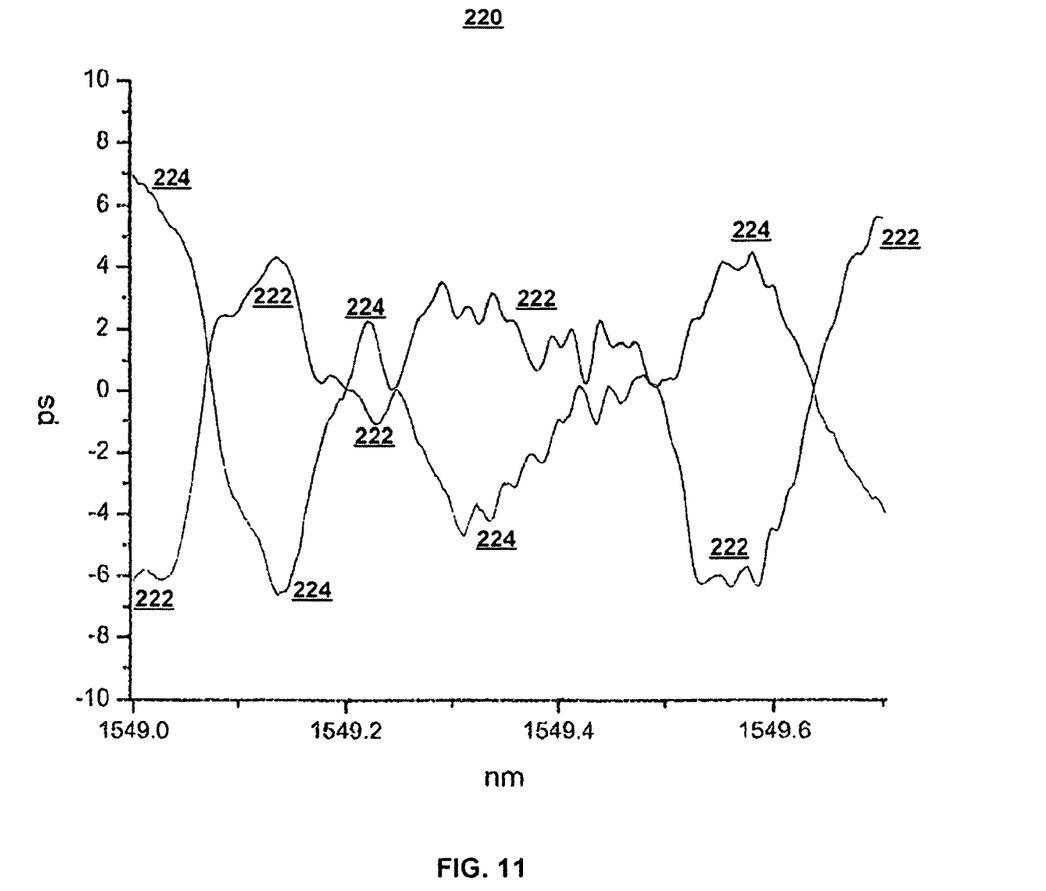

FIG. 11 shows a plot 220 illustrating another example of a trimming technique using the described offset. A first trace 222 shows the pre-trimming group delay ripple. A second trace 224 is obtained by subtracting the pre-trimming group delay from the post-trimming group delay, which is the net group delay change due to the trimming. Because of the use of the described offset, it will be seen that the upper and lower traces 222 and 224 are complementarily aligned with each other, thus achieving the desired result.

Figure 12:
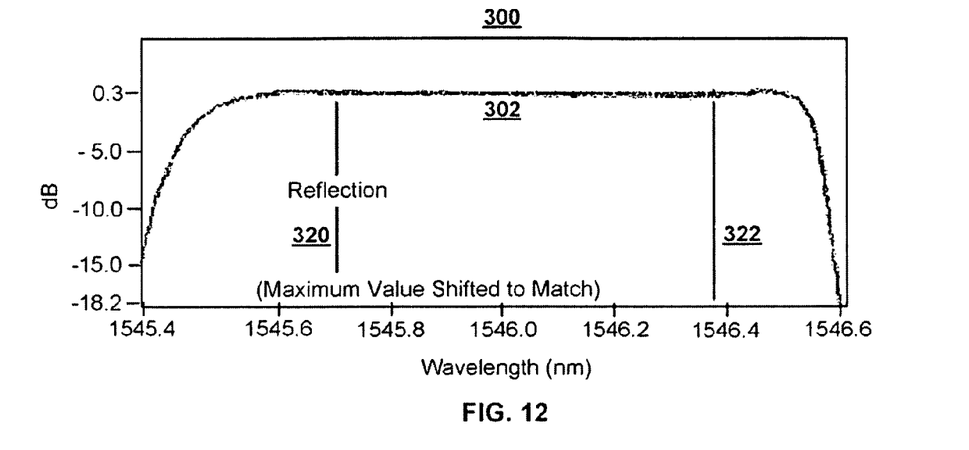
FIGS. 12, 13, 14A, and 14B are a series of OVA plots illustrating an example of an application of the described techniques.

FIGS. 12, 13, 14A, and 14B are a series of plots 300, 310, 330, and 330' showing an example of the above-described GDR trimming effect on a sample grating. In the FIG. 12 plot 300, trace 302 shows the relationship between reflection (expressed in decibels along the y-axis) and wavelength (expressed in nanometers along the x-axis) of the grating, before and after trimming. The reflection spectra are basically the same, creating the appearance of a single trace. The bandwidth between 320 and 322, which is 0.68 nm, is the bandwidth of interest for the final device.

Figure 13:
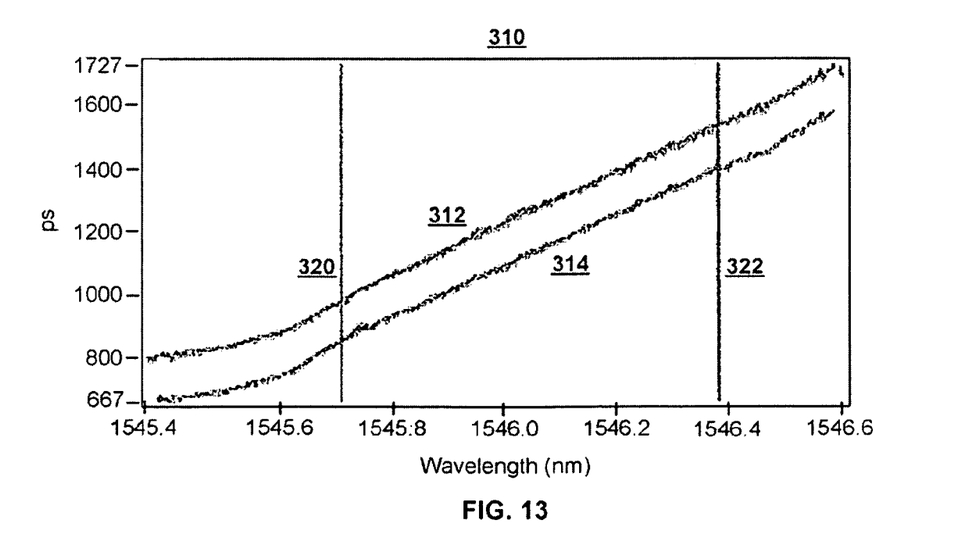

In the FIG. 13 plot 310, the upper trace 312 shows the pre-trimming relationship between group delay (expressed in picoseconds along the y-axis) and wavelength (expressed in nanometers along the x-axis), and the lower trace 314 shows the post-trimming relationship between group delay and wavelength. The two traces 312 and 314 are shown with a manual offset to provide a better view. The slope of these traces is the dispersion of the grating, which is 745 ps/nm. Based on this dispersion value, the trimming bandwidth BW for this device is found in FIG. 4 to be 0.8 nm.

Figure 14A:
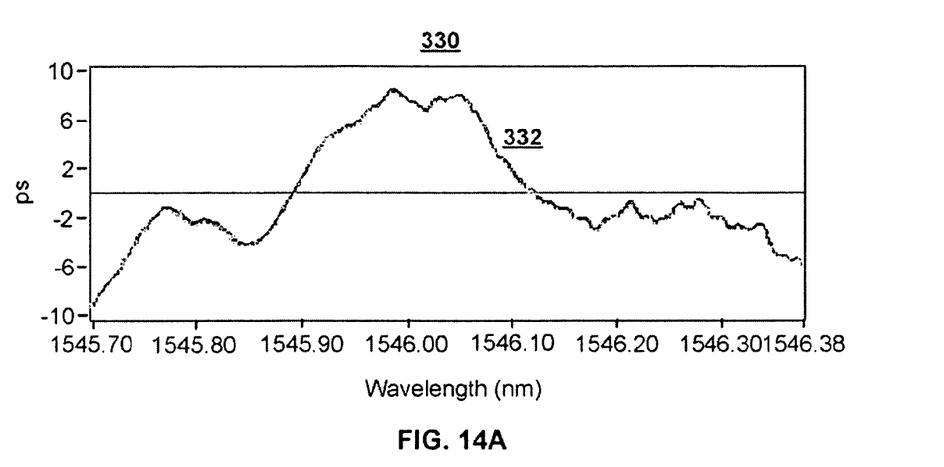
Figure 14B:
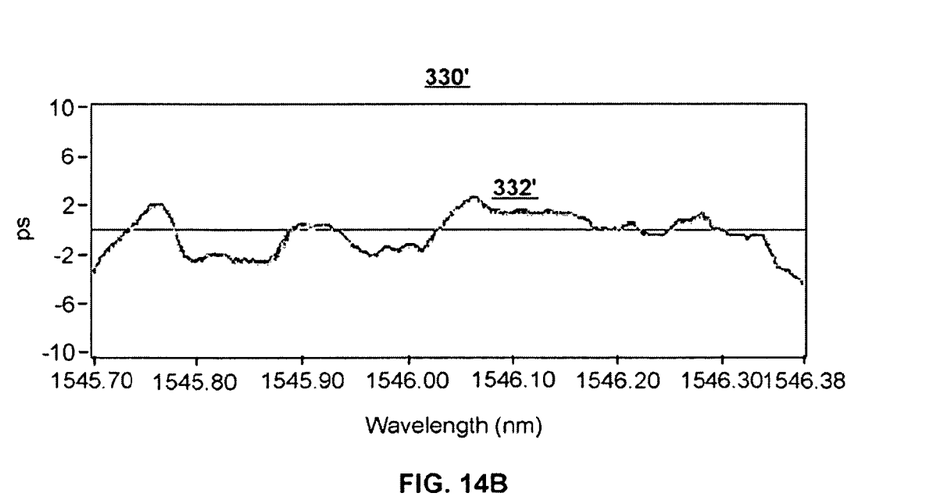
Figure 15:
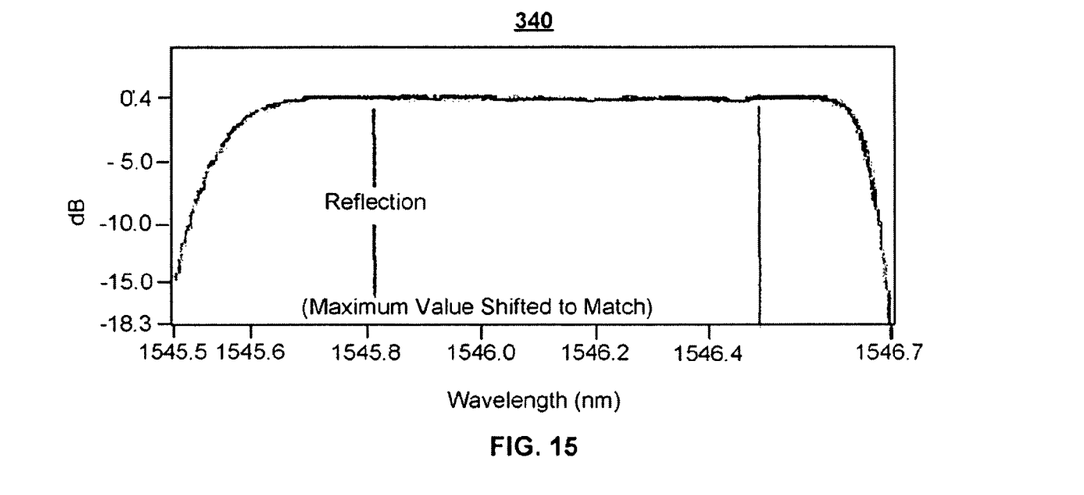
FIGS. 15, 16, 17A, and 17B are a series of OVA plots illustrating a further example of an application of techniques according to the described techniques.
Figure 16:
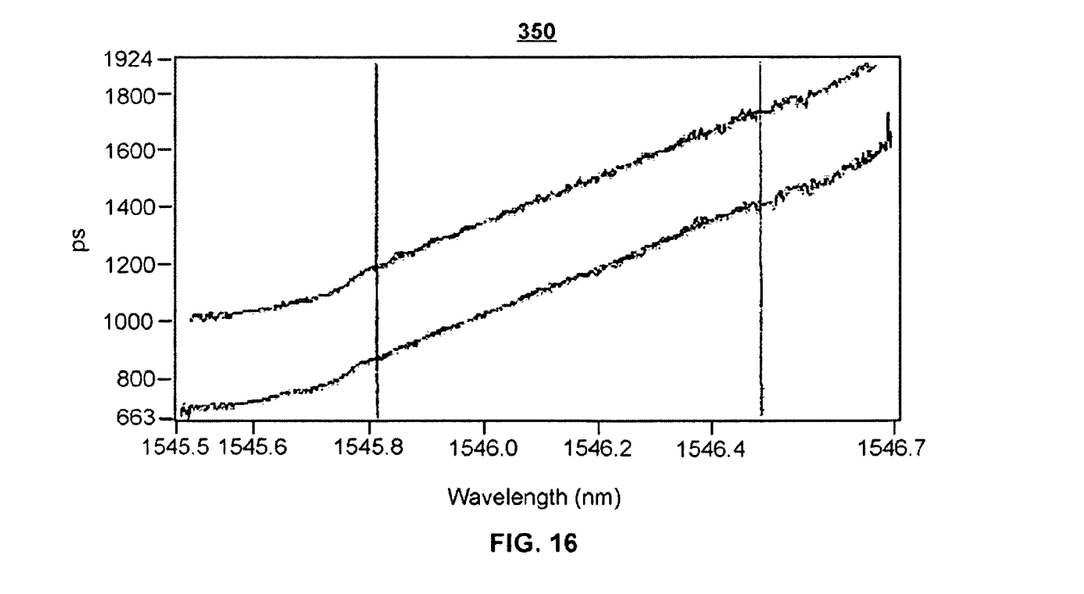

As discussed above, the trimming bandwidth corresponds to physical locations on the grating, and is found to be 60.8 mm in scanning length. A heat scanning profile is calculated, as further described above, which is loaded into the control software and run. The FIGS. 14A and 14B plots 330 and 330' show, respectively, the group delay ripples in the 0.68 nm bandwidth before and after the trimming. In FIG. 14A, trace 332 shows the pre-trimming 100 pm smoothed group delay ripple, which is obtained by subtracting a fitted line from the pre-trimming group delay data. In FIG. 14B, trace 332' shows the post-trimming 100 pm smoothed group delay ripple, which is obtained by subtracting a fitted line from the post-trimming group delay data. As illustrated in FIGS. 14A and 14B, the trimming technique has produced a significant reduction in the group delay ripple.

Figure 17A:
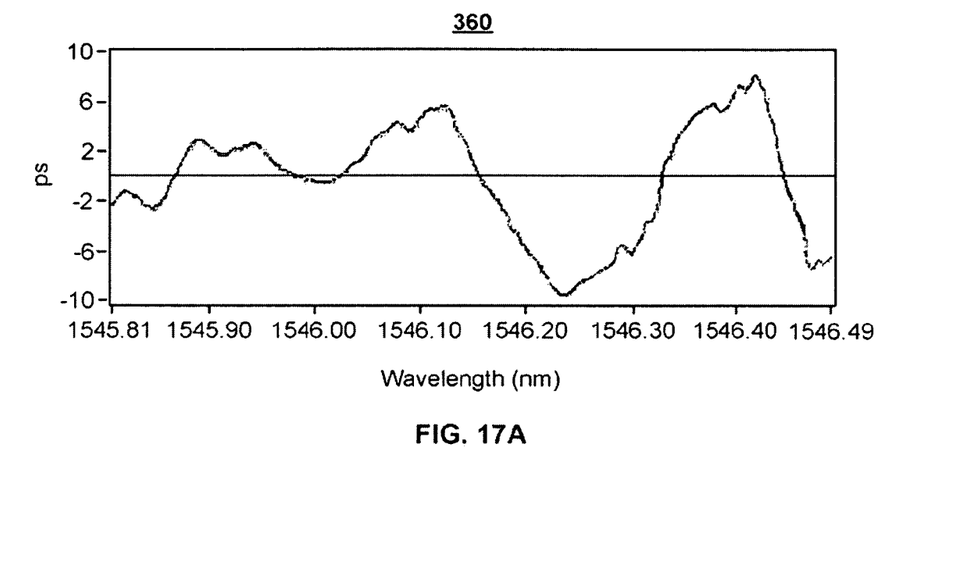
Figure 17B:
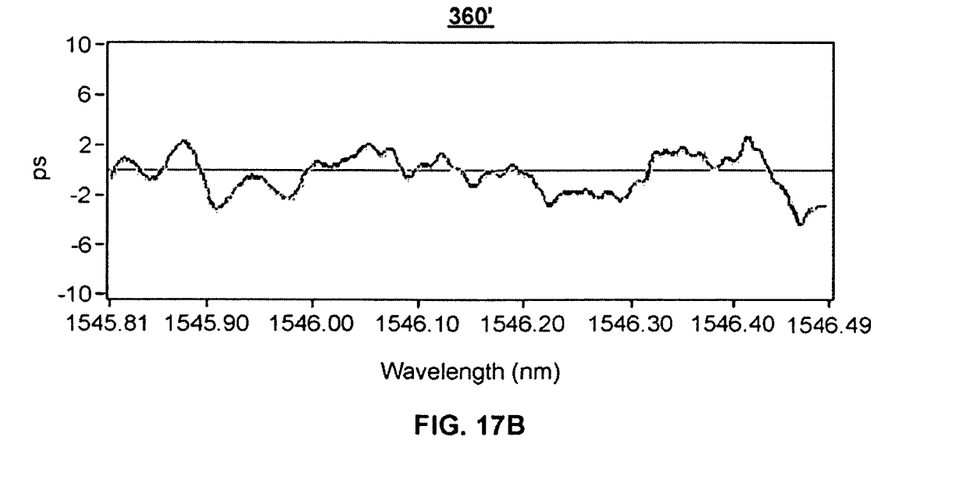

FIGS. 15, 16, 17A and 17B are a series of plots 340, 350, 360 and 360' illustrating a further example of the invention with respect to a second grating. In this case, the dispersion is 814 ps/nm and the trimming bandwidth is found to be 0.72 nm. The scanning length is found to be 60.3 mm. Again, as shown in FIGS. 17A and 17B, the described trimming technique produces a significant decrease in the group delay ripple.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for reducing group delay ripple in a fiber grating, comprising:
   (a) mounting the grating into a trimming setup that includes a trimming device and a scanning assembly for causing a region of the grating to be scanned along its length by the trimming device output, the grating having a chemical composition that is sensitive to the trimming device output, such that exposure to the trimming device output causes a change in the effective refractive index of the scanned region, the amount of change varying as a function of scanning velocity;
   (b) selecting a region of the grating to be trimmed; and
   (c) programming a scanning velocity profile into the scanning assembly that is calculated to modify the effective refractive index of the selected grating region along its length so as to smooth out group delay ripple in the selected grating region,
   wherein step (c) includes
   in the selected grating region, obtaining group delay data for a range of wavelengths, wherein group delay ripple corresponds to deviations of the group delay data with respect to a linear fit of the relationship between the group delay data and wavelength, and wherein the range of wavelengths corresponds to a range of respective distances along the length of the selected grating region;
   converting deviations in group delay data at wavelengths within the range of wavelengths into corresponding deviations in effective refractive index at respective distances along the length of the selected grating region; and constructing the scanning velocity profile using the deviations in effective refractive index in conjunction with a calibration curve indicating the relationship between scanning velocity and changes in effective refractive index caused by the trimming device.

2. The method of claim 1, wherein the trimming device is a laser.

3. The method of claim 1, wherein the trimming device is a heating element.

4. A method for reducing group delay ripple in a fiber grating, comprising:
   (a) mounting the grating into a trimming setup that includes a trimming device and a scanning assembly for causing a region of the grating to be scanned along its length by the trimming device output, the grating having a chemical composition that is sensitive to the trimming device output, such that exposure to the trimming device output causes a change in the effective refractive index of the scanned region, the amount of change varying as a function of scanning velocity;
   (b) selecting a region of the grating to be trimmed; and
   (c) programming a scanning velocity profile into the scanning assembly that is calculated to modify the effective refractive index of the selected grating region along its length so as to smooth out group delay ripple in the selected grating region,
   wherein step (c) includes
   (c1) with respect to a selected region of the grating, obtaining data with respect to the relationship between wavelength and group delay;
   (c2) performing a linear fit of the data obtained in (c1), and subtracting the data from the fit to obtain the relationship between wavelength deviation and group delay;
   (c3) converting the relationship obtained in (c2) into a relationship between effective refractive index deviation and group delay;
   (c4) converting the relationship obtained in (c3) into a relationship between effective refractive index deviation and distance along the length of the selected grating region; and
   (c5) using the relationship obtained in (c4) and a calibration curve to calculate the scanning velocity profile.

5. The method of claim 4, wherein the calibration curve in step (c5) is determined by using the same trimming setup and trimming parameters to perform a series of trials on similar gratings with the same photosensitizing and thermal annealing history.

6. The method of claim 4, wherein step (c1) includes:
   using a reflection spectrum to plot the relationship between wavelength and group delay, and finding its dispersion slope;
   using the dispersion slope to find a trimming bandwidth.

7. The method of claim 6, further including:
   using a lookup table to find the trimming bandwidth based upon the dispersion slope.

8. The method of claim 6, further including:
   finding a 1 dB center wavelength of the reflection spectrum; and
   extracting data from a region of the reflection spectrum between the 1 dB center wavelength minus one-half of the bandwidth and the 1 dB center wavelength plus one-half of the bandwidth.

9. The method of claim 8, wherein the step of finding a 1 dB center wavelength includes:

finding a 3 dB center wavelength from the reflection spectrum;
averaging the spectrum in the region with the 3 dB center wavelength plus or minus 0.25 nm;
using the averaged spectrum value to find the 1 dB center wavelength.

10. The method of claim 4, wherein the trimming device is a heating element, and wherein step (b) includes:
   (b1) using a circulator and a broadband source to obtain a reflection spectrum from the grating;
   (b2) finding a 1 dB center wavelength of the reflection spectrum;
   (b3) turning on the heating element to a low voltage to cause a dip in the reflection spectrum;
   (b4) moving the heating element so that the dip is aligned to the 1 dB center wavelength minus one-half of the trimming bandwidth; and
   (b5) moving the heating element so that the dip is aligned to the 1 dB center wavelength plus one-half of the trimming bandwidth, the scan starting and ending points corresponding to the heating element positions in (b4) and (b5), the distance therebetween being the scanning distance.

11. The method of claim 10, wherein step (b5) includes:
   applying an offset to the scan starting point.

12. The method of claim 11, further including:
   using the series of trials on similar gratings to find the offset for the scan starting point.

13. A trimming setup for reducing group delay ripple in a fiber grating, comprising:
   a mounting assembly for receiving a grating to be trimmed;
   a trimming device; and
   a scanning assembly for causing a region of the grating to be scanned along its length by the trimming device output, the grating having a chemical composition that is sensitive to the trimming device output, such that exposure to the trimming device output causes a change in the effective refractive index of the scanned region, the amount of change varying as a function of scanning velocity; and
   programmable controller means for causing the trimming device to be scanned along the length of the grating region according to a scanning velocity profile constructed by
   in the selected grating region, obtaining group delay data for a range of wavelengths, wherein group delay ripple corresponds to deviations of the group delay data with respect to a linear fit of the relationship between the group delay data and wavelength, and wherein the range of wavelengths corresponds to a range of respective distances along the length of the selected grating region;
   converting deviations in group delay data at wavelengths within the range of wavelengths into corresponding deviations in effective refractive index at respective distances along the length of the selected grating region; and
   constructing the scanning velocity profile using the deviations in effective refractive index in conjunction with a calibration curve indicating the relationship between scanning velocity and changes in effective refractive index caused by the trimming device,
   such that the scanning of the trimming device along the selected grating region modifies the effective refractive index of the selected grating region along its length so as to smooth out group delay ripple in the selected grating region.

14. The system of claim 13, wherein the trimming device is a UV laser.

15. The system of claim 13, wherein the trimming device is a heating element.

16. The trimming setup of claim 13, wherein the scanning velocity profile is constructed by:
  (a) with respect to a selected region of the grating, obtaining data with respect to the relationship between wavelength and group delay;
  (b) performing a linear fit of the data obtained in (a), and subtract the data from the fit to obtain the relationship between wavelength deviation and group delay;
  (c) converting the relationship obtained in (b) into a relationship between effective refractive index deviation and group delay;
  (d) converting the relationship obtained in (c) into a relationship between effective refractive index deviation and distance along the length of the selected grating region; and
  (e) using the relationship obtained in (d) and a calibration curve to calculate the scanning velocity profile.

\* \* \* \* \*